Jan. 11, 1944.   H. FOCKE   2,338,923
AIRCRAFT CONTROL
Filed May 5, 1939
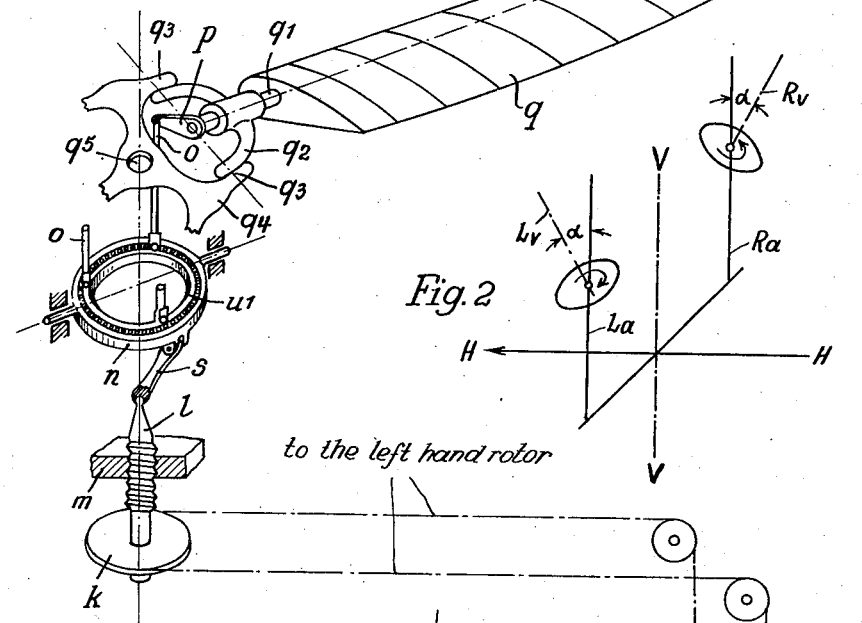
Fig. 1
Fig. 2
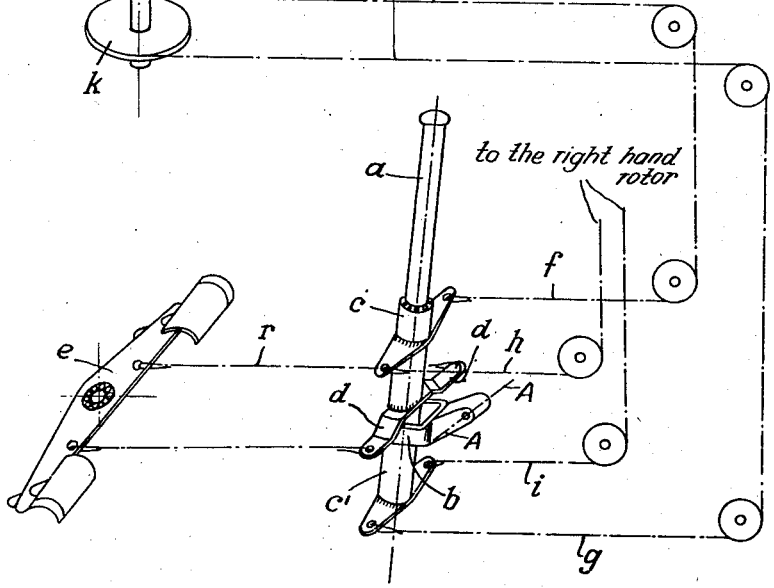
to the left hand rotor
to the right hand rotor
Inventor:
Henrich Focke
By
Watson, Cole, Grindle & Watson
Attys.

Patented Jan. 11, 1944

2,338,923

UNITED STATES PATENT OFFICE 2,338,923

AIRCRAFT CONTROL

Henrich Focke, Bremen, Germany; vested in the Alien Property Custodian

Application May 5, 1939, Serial No. 272,042
In Germany October 4, 1937

5 Claims. (Cl. 244—17)

This invention comprises improvements relating to the control of rotating wing aircraft of the helicopter or Autogiro type.

It is an object of the present invention to provide for improved lateral control of aircraft of this class comprising side by side rotors.

A particular object of the invention is to provide a control system of aircraft of this class which is very simple in construction and permits a vertical and lateral control by common constructional elements of the control mechanism.

A still further object of the invention is to provide a combined vertical and lateral control with a design of aircraft in which the rotors or their shafts, respectively, are mounted for rotation about non-tiltable or stationary, more particularly, vertical actual axes.

With these and further objects in view, which will be apparent from the within disclosure, the blades of the two rotors are mounted for independent adjustment of the angle of incidence and a special mechanism is provided for adjusting the angle of incidence of each of the blades periodically to thereby effect forward or rearward tilting of the virtual axes of the two rotors without tilting the actual axes thereof. As is known, tilting of the virtual axis of an air screw can be effected by tilting the normals to the planes of rotation of the blades, i. e., by periodical variation of the angles of incidence. Now, means are provided for effecting elevational control by producing identical forward or rearward tilting of the virtual axes of both rotors, while further means are provided for producing opposite, fore and aft tilting of the virtual axes of the two rotors, by actuation of a lateral control element in the aircraft. Thus, in case of actuation of the lateral control element, the effects neutralize each other as regards vertical control but not as regards turning about the vertical axis. In effect, the forwardly inclined virtual rotor axis on one side produces an acceleration on this side whilst the rearwardly inclined virtual rotor axis on the other side produces a retardation on that side, so that the desired lateral control is effected.

The invention will be better understood by reference to the following detailed description in connection with the accompanying drawing showing one embodiment of a control arrangement in accordance with the invention, viz.—

Fig. 1 is a fragmentary, perspective, diagrammatic view of a control system having the invention applied thereto.

Fig. 2 is a diagram for illustrating the operation of the system. The arrow indicates the travelling direction of the aircraft.

For the sake of simplicity, only one blade of one rotor, the left hand rotor, is illustrated, with the main parts of the control system for both rotors.

Each blade suitably is mounted after the customary manner by a cross beam $q^1$ in a forked sleeve $q^2$ mounted by flapping joints $q^3$ on a bearing or hub member $q^4$ which is rigidly carried at $q^5$ by the rotor shaft (not shown). Only so much of the member $q^4$ is shown as is sufficient to illustrate the mounting of the one blade $q$, other parts of this member being broken away. The control stick $a$ is swingably mounted about an axis A—A which is stationary in the aircraft by means of a forked holder $b$ which is fixedly secured on the control stick $a$, between the upper part $c$ and the lower part $c'$ of a rocker which is rotatable about the stick $a$ and has three sets of arms to which the control cables are connected as shown. The cable $fg$ is passed over the guide rollers shown and taken around a pulley $k$ associated with the left-hand rotor. The cable $hi$ is similarly passed over guide rollers and taken around a pulley associated with the right-hand rotor which is not shown. Of course, the upper and lower parts $c$ and $c'$ of the rocker are interconnected for common rotation about the stick, by means which are not shown.

The pulleys such as $k$ have screw threaded spindles $l$ working in fixed nut parts $n$, and the cable lengths $h$ and $f$ are connected with respective pulleys in such a manner that, upon pushing the stick $a$ forward, and thereby pulling on the cable lengths $h$ and $f$, the latter turn the pulleys in the direction for causing the screw threaded spindles $l$ to descend in the nut parts $m$. By this means, a ring or bearing member $n$ which is mounted for tilting about a stationary axis in the aircraft, and connected with the associated spindle $l$, by a rod $s$, is tilted and a further ring or bearing member $n'$ mounted for rotation in, or on, and tilting movement with, the bearing member $n$ is thus also tilted. In the drawing, the bearing members $n$ and $n'$ are the outer and inner race rings, respectively, of a ball bearing. It will thus be understood, that the rods $o$ linked to the inner race ring $n'$ rise and fall periodically during each revolution of the hub $q^4$ and in this fashion periodically vary in turn the angles of incidence of the blades $q$, each through a lever $p$ fast on the cross bar $q^1$ of the respective blade.

In order to permit such action of the parts, and especially swinging of the cross bar about the flap joints $q^3$, the axis of said flap joints is arranged to go through the plane in which the lever $p$ swings. Moreover, a certain play or an additional joint (not shown) is provided between the parts $o$, $p$, $q^1$, in order to permit the requisite small swinging movements of the blade about the pivot $q^3$. Larger swing movements of the blade about this pivot are rendered impossible by a supporting mechanism defining the lowest position of the blade in case of decreasing centrifugal action thereof. For the sake of clearness, this supporting mechanism which has been described in my copending application Ser. No. 191,329 and does not form part of the present invention, has not been shown. Also, for the same reason, a joint which may be advantageously provided in order to permit lateral movements of the blade with respect to the hub member $q^4$ or forked sleeve $q^2$, respectively, has been omitted.

In the instance illustrated, the ring $n$ is tilted forwardly, and the angle of incidence of the forwardly located blade is reduced whilst that of the rearwardly located blade is increased. This has the effect of depressing the nose of the aircraft. As will be apparent, the reverse effect is produced by pulling the stick $a$ backwards and thereby pulling on the cable lengths $i$ and $g$ for turning the pulleys $k$ in the opposite direction.

Right-hand and left-hand arms of a rudder bar or cross head $e$ are connected by cable lengths $r$ with respective right and left hand arms $d$ of the rocker $c$. If the rudder bar $e$ is operated, as for example to produce right-hand rudder effect, the rocker $c$ is turned about the stick $a$ by the pull of the appropriate cable length $r$ and the cable $f$, $g$ of the left-hand rotor is operated in a direction which, in accordance with what has been said above, leads to a variation of the angle of incidence of the blades of the left hand rotor producing a forward inclination of the virtual axis $L_v$ (Fig. 2) of the left hand rotor while the actual axis $L_A$ thereof remains unchanged. At the same time, however, the cables $i$, $h$, of the right hand rotor are actuated in the opposite direction, and the blades of that rotor experience a variation of the angle of incidence which produces a rearward inclination of the virtual axis $R_v$ (Fig. 2) of the right hand rotor, i. e., in such a manner that the angle alpha between this axis $R$ and the vertical or actual axis $R_a$ is the same as the oppositely directed angle alpha between the virtual axis $L$ of the left hand rotor and the vertical or actual axis $R_a$. As a result of this, the left hand side of the aircraft is accelerated and the right hand side is retarded, whereby the aircraft is caused to make a right hand turn about the vertical axis V—V, without causing rotation of the aircraft with respect to the horizontal or longitudinal axis H—H of the aircraft. In order to cause a left hand turn of the aircraft, the cross head $e$ and the parts connected thereto are operated in an opposite sense.

The superimposing of vertical and lateral controls can be appropriately effected by other kinematic means and it is to be understood that the mechanisms illustrated in the drawing are but examples of such means.

It has been found that the lateral control system according to the invention in which the virtual axes of the rotors are oppositely tilted while the actual axes of the rotors remain stationary, offers considerable practical and aerodynamical advantages over systems in which the actual axes are tilted.

This is a continuation in part of my application Serial No. 191,328, entitled: "Aircraft controls."

I claim:

1. In aircraft control mechanism for side by side rotors each rotor comprising blade incidence adjustments, a control stick, a rocker rotatable about said control stick and rockable therewith, operative connections between said rocker and respective rotor adjustments, whereby said adjustments are effected in the same direction upon fore and aft tilting of the control stick, and a rudder bar operatively connected with said rocker for rotating the latter about said stick, to actuate said adjustments in opposition.

2. In aircraft control mechanism for side by side rotors each rotor comprising blade incidence adjustments, a control stick, a sleeve rotatable about said stick, right hand and left hand arms on said sleeve, operative connections between said arms and the respective adjustments adapted for producing "nose down" or "nose up" effects according to the rocking of said stick, a rudder bar, and operative connections between said rudder bar and said sleeve for rotating the latter about said stick for producing lateral control effects by reciprocal operations of said blade incidence adjustments.

3. The combination with a helicopter or rotating wing aircraft having rotors located side by side, of means for effecting the lateral control of said aircraft comprising, a lateral control element adapted for operation to steer the aircraft, each of said rotors comprising a plurality of blades mounted for independent adjustment of the angle of incidence and each having a flapping joint, means associated with each rotor for adjusting the angle of incidence of each of said blades periodically, whereby with the aid of said joints to effect forward or rearward tilting of the virtual axis of the rotor, and means associating said element and said adjusting means to so adjust said angles of incidence changing means as to oppositely tilt said virtual axes of the two rotors upon movement of said element.

4. In a helicopter or rotating wing aircraft, a pair of rotors located side by side and comprising each a plurality of flap jointed blades mounted for independent adjustment of the angle of incidence, means for adjusting the angle of incidence of each of the blades periodically to thereby effect forward or rearward tilting of the virtual axis of said rotor, means for effecting elevational control including apparatus for producing identical forward or rearward tilting of the virtual axes of both rotors said apparatus effecting similar angle of incidence adjustment of both rotors, and means for effecting the lateral control of the aircraft comprising, a lateral control element adapted for operation to steer the aircraft and means associating said angle of incidence element and said adjusting means to actuate them to oppositely tilt said virtual axes of the two rotors upon movement of said element.

5. In a helicopter or rotating wing aircraft, a pair of rotors located side by side and comprising each, a plurality of flap jointed blades mounted for independent adjustment of the angle of incidence, means for adjusting the angle of incidence of each of the blades periodically to thereby effect forward or rearward tilting of the virtual axis of said rotor, means for producing identical forward or rearward tilting of the virtual axes of both rotors to effect elevational control and means forming a constructional unit with said elevational control means for effecting the lateral control of the aircraft comprising, a lateral control element adapted for operation to steer the aircraft and means associating said element and said adjusting means to oppositely tilt said virtual axes of the two rotors by similar angles upon movement of said element.

HENRICH FOCKE.